US006785594B1

(12) United States Patent
Bateman et al.

(10) Patent No.: US 6,785,594 B1
(45) Date of Patent: Aug. 31, 2004

(54) GROUND PROXIMITY WARNING SYSTEM AND METHOD HAVING A REDUCED SET OF INPUT PARAMETERS

(75) Inventors: C. Don Bateman, Bellevue, WA (US); Steven C. Johnson, Issaquah, WA (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/534,222

(22) Filed: Mar. 24, 2000

Related U.S. Application Data

(60) Provisional application No. 60/126,197, filed on Mar. 25, 1999.

(51) Int. Cl.⁷ .......................... G08G 5/04; G08B 23/00; G01C 5/00
(52) U.S. Cl. ........................... 701/9; 701/206; 340/970
(58) Field of Search .................. 701/9, 4, 14, 206, 701/301; 340/970, 945, 963, 967, 969, 977; 73/178 R, 178 T; 342/65

(56) References Cited

U.S. PATENT DOCUMENTS

| | | | |
|---|---|---|---|
| 3,589,648 A | 6/1971 | Gorham et al. | 244/77 A |
| 3,715,718 A | 2/1973 | Astengo | 340/990 |
| 3,925,751 A | 12/1975 | Bateman et al. | 340/967 |
| 3,934,221 A | 1/1976 | Bateman et al. | 340/970 |
| 3,934,222 A | 1/1976 | Bateman et al. | 340/970 |
| 3,936,796 A | 2/1976 | Bateman | 340/970 |
| 3,944,968 A | 3/1976 | Bateman et al. | 340/970 |
| 3,947,808 A | 3/1976 | Bateman | 340/970 |
| 3,947,810 A | 3/1976 | Bateman et al. | 340/970 |
| 3,958,218 A | 5/1976 | Bateman | 340/970 |
| 3,958,219 A | 5/1976 | Bateman et al. | 340/970 |
| 4,030,065 A | 6/1977 | Bateman | 340/970 |
| 4,060,793 A | 11/1977 | Bateman | 340/970 |
| 4,125,334 A | 11/1978 | Jones | 340/970 |

(List continued on next page.)

FOREIGN PATENT DOCUMENTS

WO    WO 99/42788    8/1999    ............ G01C/5/00

*Primary Examiner*—Tan Q. Nguyen
*Assistant Examiner*—Dalena Tran
(74) *Attorney, Agent, or Firm*—Honeywell Int'l Inc.

(57) ABSTRACT

The ground proximity warning system and method provide a number of alerts based upon a substantially reduced list of input parameters relative to a conventional ground proximity warning system and method. The ground proximity warning system and method generally constructs alert envelopes and generates alerts if the upcoming terrain or other obstacles pierce the alert envelopes. The ground proximity warning system and method can also generate alerts if the aircraft has an excessive descent rate at a relatively low altitude and if the aircraft descends immediately following takeoff in a similar fashion to Mode 1 and Mode 3 alerts. Further, the ground proximity warning system and method can provide altitude call outs at predefined altitudes above a target runway and can provide alerts if the aircraft appears to be landing short of a runway. The ground proximity warning system and method are capable of providing the various warnings based upon only a pressure altitude, GPS signals and, in some embodiments, the external air temperature. Thus, the ground proximity warning system and method can be independent of a radio altimeter, an ADC, a glideslope receiver and signals indicative of the configuration of the landing gear and flaps.

36 Claims, 8 Drawing Sheets

U.S. PATENT DOCUMENTS

| | | | | |
|---|---|---|---|---|
| 4,224,669 A | * | 9/1980 | Brame | 364/433 |
| 4,319,218 A | | 3/1982 | Bateman | 340/970 |
| 4,567,483 A | * | 1/1986 | Bateman et al. | 340/970 |
| 4,646,244 A | * | 2/1987 | Bateman et al. | 364/461 |
| 4,675,823 A | | 6/1987 | Noland | 701/300 |
| 4,894,655 A | | 1/1990 | Joquet et al. | 340/988 |
| 4,903,212 A | | 2/1990 | Yokouchi et al. | 701/216 |
| 4,912,645 A | | 3/1990 | Kakihara et al. | 701/208 |
| 4,914,436 A | | 4/1990 | Bateman et al. | 340/970 |
| 4,954,959 A | | 9/1990 | Moroto et al. | 701/211 |
| 5,059,964 A | * | 10/1991 | Bateman | 340/968 |
| 5,070,458 A | * | 12/1991 | Gilmore et al. | 364/424.06 |
| 5,075,685 A | * | 12/1991 | Vermilion et al. | 340/970 |
| 5,155,688 A | | 10/1992 | Tanaka et al. | 701/221 |
| 5,257,195 A | | 10/1993 | Hirata | 701/216 |
| 5,265,025 A | | 11/1993 | Hirata | 701/213 |
| 5,293,163 A | | 3/1994 | Kakihara et al. | 340/995.13 |
| 5,293,318 A | | 3/1994 | Fukushima | 701/416 |
| 5,337,242 A | | 8/1994 | Yamamoto et al. | 701/208 |
| 5,349,347 A | * | 9/1994 | Muller | 340/969 |
| 5,392,052 A | | 2/1995 | Eberwine | 342/357 |
| 5,414,631 A | * | 5/1995 | Denoize et al. | 364/461 |
| 5,608,392 A | * | 3/1997 | Faivre et al. | 340/967 |
| 5,781,126 A | | 7/1998 | Paterson et al. | 340/970 |
| 5,839,080 A | | 11/1998 | Muller et al. | 701/9 |
| 5,936,552 A | * | 8/1999 | Wichgers et al. | 340/963 |
| 6,043,758 A | * | 3/2000 | Snyder, Jr. et al. | 340/970 |

* cited by examiner

GROUND PROXIMITY WARNING SYSTEM AND METHOD HAVING A REDUCED SET OF INPUT PARAMETERS

CROSS-REFERENCE TO RELATED APPLICATIONS

The present application claims priority from U.S. Provisional Application Serial No. 60/126,197 entitled General Aviation Enhanced Ground Proximity Warning System filed Mar. 25, 1999, the contents of which are incorporated herein by reference.

FIELD OF THE INVENTION

The present invention relates generally to ground proximity warning systems and methods and, more particularly, to ground proximity warning systems and methods having a reduced set of input parameters in order, for example, to enhance the situational awareness of the pilots of general aviation aircraft in a cost effective manner.

BACKGROUND OF THE INVENTION

An important advancement in aircraft flight safety has been the development of ground proximity warning systems, also known as terrain awareness systems. These warning systems analyze the flight parameters of the aircraft and the terrain surrounding the aircraft. Based on this analysis, these warning systems provide alerts to the flight crew concerning possible inadvertent collisions of the aircraft with surrounding terrain or other obstacles, including instances in which the flight path of the aircraft would appear to bring the aircraft in short of the runway.

Ground proximity warning systems often have several modes in order to provide various types of alerts depending upon the flight conditions. For example, the enhanced ground proximity warning system provided by AlliedSignal Inc. has six primary modes of operation. Mode 1 is designed to provide alerts for an aircraft having an excessive descent rate that is relatively close to the underlying terrain. Mode 2 provides an alert in instances in which an aircraft is closing with the terrain at an excessive rate, even in instances in which the aircraft is not descending. Mode 3 provides alerts in instances in which an aircraft loses significant altitude immediately after take off or during a missed approach. Mode 4 provides alerts for insufficient terrain clearance based upon the phase of flight and the speed of the aircraft. In this regard, Mode 4 provides alerts based upon different criteria depending upon whether the aircraft is in the take off phase of flight or in the cruise or approach phases of flight and further depending upon whether the gear is in a landing configuration. Mode 5 also provides two levels of alerts when the aircraft flight path descends below the glideslope beam on front course instrument landing system (ILS) approaches. Finally, Mode 6 provides alerts or call-outs for descent below predefined altitudes or the like during an approach, as well as alerts for excessive roll or bank angles.

In addition to the various modes of operation, the enhanced ground proximity warning system provided by AlliedSignal Inc. defines an alert envelope and, more particularly, both a caution envelope and a warning envelope. The imaginary alert envelopes move with the aircraft and are constructed to extend forwardly of the aircraft and to define a region in which alerts will be generated if terrain or other obstacles enter by penetrating one of the alert envelopes. In this regard, U.S. Pat. No. 5,839,080 to Hans R. Muller et al. and assigned to AlliedSignal Inc. describes an advantageous ground proximity warning system that generates an alert envelope. The contents of U.S. Pat. No. 5,839,080 are hereby incorporated by reference in their entirety.

As described by U.S. Pat. No. 5,839,080, an alert envelope is defined by a number of parameters, including a look ahead distance (LAD), a base width (DOFF) and a terrain floor ($\Delta$H). In general terms, the look ahead distance defines the distance in advance to the aircraft that the alert envelope extends. Similarly, the terrain floor typically defines a vertical distance below the aircraft which is utilized during the construction of the floor of the alert envelope. Further, the base width is the lateral width of the alert envelope at a location proximate the aircraft.

As described by U.S. Pat. No. 5,839,080, the ground proximity warning system can construct a pair of alert envelopes, namely, a caution envelope and a warning envelope. While each envelope has a similar shape as described above, the caution envelope typically extends further ahead of the aircraft than the warning envelope and is therefore generally larger than the warning envelope. Accordingly, the ground proximity warning system will generate cautionary alerts in instances in which the upcoming terrain or other obstacles penetrate the caution envelope, but not the warning envelope. Once the upcoming terrain or other obstacles penetrate the warning envelope, however, the ground proximity warning system will generate a more severe warning alert. As such, a pilot can discern the severity of the alert and the speed with which evasive maneuvers must be taken in order to avoid the upcoming terrain or other obstacles based upon the type of alert that is provided, i.e., a less severe cautionary alert or a more severe warning alert.

In addition to the various modes of operation and the alert envelopes described above, ground proximity warning systems can also provide other types of alerts. For example, the enhanced ground proximity warning system provided by AlliedSignal Inc. also provides a terrain clearance floor (TCF) alert. In particular, the enhanced ground proximity warning system creates an increasing terrain clearance envelope around an intended runway and alerts are provided if the flight path of the aircraft penetrates the terrain clearance floor, thereby providing alerts if the flight path of the aircraft indicates that the aircraft may land short of the runway. See, for example, U.S. patent application Ser. No. 09/496,296, entitled "Apparatus, Method, and Computer Program Product for Generating Terrain Clearance Floor Envelopes about a Selected Runway" filed Feb. 1, 2000 and U.S. patent application Ser. No. 09/454,924, entitled "Methods, Apparatus and Computer Program Products for Automated Runway Selection" filed Dec. 3, 1999 (hereinafter the '924 application) which describe the generation of a terrain clearance floor and the selection of the runway about which the terrain clearance floor is constructed, respectively. The contents of both of these applications are herein incorporated by reference in their entirety.

While ground proximity warning systems have substantially improved the situational awareness of flight crews of commercial aircraft by providing a variety of alerts of upcoming situations that merit the attention of the flight crews and by providing graphical displays of the upcoming terrain, obstacles and other notable features, ground proximity warning systems generally require a relatively robust set of input parameters. For example, conventional ground proximity warning systems require a signal indicative of the radio altitude from a radio altimeter, signals indicative of the altitude, the computed airspeed, the corrected altitude, the altitude rate, the true airspeed and the static air temperature from an Air Data Computer (ADC), signals indicative of the position, the magnetic track and the corrected altitude from a Flight Management System (FMS), signals indicative of the acceleration, attitude, altitude, vertical speed, position, magnetic heading/track, true heading/track and ground speed from an inertial reference system (IRS) and/or an attitude heading reference system (AHRS), signals indicative of the position, position quality, altitude, ground speed, ground track, date, time and status from a global navigation positioning system (GNSS) or a global positioning system (GPS) (hereinafter collectively referenced as a GPS), signals indicative of the glideslope deviation, a localizer deviation and the selected runway coordinates from an instrument landing system (ILS) and/or a microwave landing system (MLS) as well as other signals from other avionic subsystems. Therefore, for a conventional ground proximity warning system to be fully functional, the aircraft must not only carry the ground proximity warning system, but must also have a number of other subsystems, such as a radio altimeter, an ADC, an FMS, an IRS or an AHRS, a GPS and an ILS or a MLS. As will be apparent, each of these subsystems is quite expensive. However, most large commercial aircraft are mandated to have most, if not all, of these subsystems, such that the input parameters required by a conventional ground proximity warning system are readily available.

In contrast to commercial aircraft, general aviation aircraft, such as light turbine and piston aircraft, are not required to have many of the foregoing subsystems and, as a result, do not carry most of the foregoing subsystems since each subsystem is quite expensive. For example, most general aviation aircraft do not include a radio altimeter or an ADC. In addition, most general aviation aircraft do not include a glideslope receiver and do not provide any signals indicative of the configuration of the landing gear or flaps, as many aircraft have a fixed down landing gear. Even though GPS is becoming increasingly more affordable and many general aviation aircraft therefore carry GPS equipment, conventional ground proximity warning systems cannot function properly based upon the parameters provided solely by the GPS, such as the position, position quality, altitude, ground speed, ground track, date, time and status, without input from a variety of other subsystems that are not generally carried by general aviation aircraft.

General aviation aircraft typically fly at much lower altitudes and in much closer proximity to the underlying terrain and other obstacles than commercial aircraft and would therefore appear to have at least as great, if not greater, of a need for a ground proximity warning system and the various alerts provided by ground proximity warning systems. However, general aviation aircraft cannot generally support a ground proximity warning system since the general aviation aircraft does not carry the other subsystems that would be required in order to provide the ground proximity warning system with the necessary input parameters.

SUMMARY OF THE INVENTION

The ground proximity warning system and method of the present invention are designed to provide a number of alerts based upon a substantially reduced set of input parameters. Thus, the ground proximity warning system and method of the present invention can greatly improve the situational awareness of a flight crew without requiring that the aircraft carry a number of other subsystems for providing the robust set of input parameters demanded by conventional ground proximity warning systems. The ground proximity warning system and method of the present invention is therefore particularly well suited for general aviation aircraft that have a GPS receiver, but that do not include a radio altimeter, an ADC or the like.

The ground proximity warning system and method of the present invention include a processor, responsive to a GPS receiver, for determining a positional relationship between an aircraft and upcoming terrain. According to the present invention, the processor is capable of determining the positional relationship between the aircraft and the upcoming terrain based only upon a pressure altitude, signals provided by the GPS and elevational data associated with the upcoming terrain. For example, the GPS signals may include at least one and, more typically, each of the following signals: latitude, longitude, ground speed, ground track, GPS altitude and a quality parameter. In addition, the processor can be responsive to a temperature probe and runway data. In this embodiment, the processor is therefore capable of determining the positional relationship between the aircraft and the upcoming terrain based upon the external air temperature in addition to the pressure altitude, the GPS signals and the elevational data associated with the upcoming terrain.

The ground proximity warning system and method of one embodiment also determines the positional relationship between the aircraft and a runway, typically the runway upon which the aircraft intends to land. According to this embodiment, the processor is capable of determining the positional relationship between the aircraft and the runway based only upon the pressure altitude, the GPS signals and data associated with the runway. Thus, the ground proximity warning system and method of this embodiment can detect instances in which the aircraft may land short of the runway based upon the positional relationship between the aircraft and the runway.

Accordingly, the ground proximity warning system and method of the present invention is capable of functioning with a dramatically reduced set of input parameters relative to conventional ground proximity warning systems and methods. In this regard, the ground proximity warning system and method of the present invention can determine the positional relationship between the aircraft and the upcoming terrain and, in some instances, between the aircraft and an intended runway in a manner independent of at least one and, more typically, each of the following signals: radio altitude, indicated air speed, roll angle, the respective positions of the landing gear and flaps and the glideslope. As such, the ground proximity warning system and method of the present invention do not require an aircraft to also include a number of other relatively expensive subsystems in order to provide the robust set of input parameters demanded by conventional ground proximity warning systems and methods. Thus, the ground proximity warning system and method is well suited for general aviation aircraft which are not required to have radio altimeters, ADCs or the like.

A ground proximity warning system and method of the present invention also include a warning mechanism for providing an alert, if the processor determines that the positional relationship between the aircraft and the upcoming terrain and/or the intended runway fails to meet an alert criteria. In this regard, the ground proximity warning system can also include a memory device for storing a terrain database defining the elevational data for the upcoming terrain and, in some instances, a runway database providing data associated with the intended runway. As such, the processor can construct a warning envelope extending in advance of the aircraft which can then be compared to the elevational data associated with the upcoming terrain such that a warning alert is provided if the upcoming terrain pierces the warning envelope. Likewise, the processor can construct a caution envelope extending further in advance of the aircraft than the warning envelope and can compare the caution envelope to the elevational data associated with the upcoming terrain such that a cautionary alert can also be provided if the upcoming terrain pierces the caution envelope. Further, the processor can determine the geometric altitude of the aircraft as well as the difference between the geometric altitude and the elevation of the local terrain such that an alert can be provided if the difference between the geometric altitude and the elevation of the local terrain is less than a predetermined altitude. Thus, the ground proximity warning system and method of this embodiment can provide callouts at different altitudes above the underlying terrain, such as during an approach.

The ground proximity warning system and method of the present invention can also provide alerts analogous to the alerts provided in several of the modes of a conventional ground proximity warning system and method. For example, a ground proximity warning system and method of one embodiment can provide an alert if the aircraft is determined to have an excessive descent rate at a relatively low altitude in a similar fashion to a Mode 1 alert provided by a conventional ground proximity warning system and method. In this embodiment, the ground proximity warning system determines a pseudo radio altitude and a vertical velocity and thereafter determines if the vertical velocity of the aircraft at the particular pseudo radio altitude exceeds a predetermined sink rate and, if so, preferably activates a warning mechanism for providing an alert. More particularly, the ground proximity warning system and method of this embodiment determine the pseudo radio altitude based upon a geometric altitude and the elevation of local terrain. Since the geometric altitude is typically associated with a figure of merit, the alerts provided by the ground proximity warning system and method of this embodiment are preferably disabled if the pseudo radio altitude is less than the figure of merit, thereby preventing potentially erroneous alerts from being generated. The ground proximity warning system and method of this embodiment also preferably determine the vertical velocity based upon a combination of a first vertical velocity derived from a signal indicative of pressure altitude and a second vertical velocity derived from GPS signals. Thus, the ground proximity warning system of this embodiment can determine a reliable vertical velocity even though the ground proximity warning system and method are typically independent of an IRS or an AHRS that otherwise would provide the vertical speed of the aircraft.

A ground proximity warning system and method according to another embodiment of the present invention detects a descent following takeoff from a runway in order to provide an alert in much the same fashion as alerts provided by a conventional ground proximity warning system and method operating in Mode 3. In this regard, the ground proximity warning system and method of this embodiment include a processor, responsive to a signal indicative of the pressure altitude and to GPS signals, but independent of a radio altitude, for determining height above field, typically based upon geometric altitude values. In addition, the processor determines if an altitude loss of the aircraft at the height above field on takeoff exceeds a predetermined altitude loss and, if so, actuates a warning mechanism for providing an alert. In order to avoid nuisance alerts, the warning mechanism is preferably disabled if the height above field is less than a figure of merit associated with the geometric altitude. Likewise, the warning mechanism is preferably disabled once the height above field is at least as great as a predetermined threshold.

According to the present invention, the embodiments of the ground proximity warning system and method that provide alerts for an excessive sink rate and for excessive descent after takeoff are capable of providing the alerts based solely upon pressure altitude, GPS signals and elevational data association with the respective runways and the local terrain. In addition, the ground proximity warning system and method of these embodiments can also be responsive to a temperature probe such that the pseudo radio altitude and the height above field and also based upon the external air temperature.

While the ground proximity warning system and method of these embodiments are capable of providing the desired alerts in response to only a limited set of input signals, the ground proximity warning system and method of these embodiments are also capable of processing the available signals and providing the desired alerts in the manner independent of many of the signals required by conventional ground proximity warning systems, such as signals indicative of the radio altitude, the indicated airspeed, the roll angle, the respective positions of the landing gear and flaps and the glideslope. Thus, the ground proximity warning systems and methods of these embodiments of the present invention provide alerts that are analogous to the alerts provided by the various modes of conventional ground proximity warning systems and methods without requiring that the ground proximity warning system and method of the present invention interface with as many other subsystems in order to supply the requisite input parameters.

Therefore, the ground proximity warning system and method of the present invention provide alerts in various predefined situations in order to substantially increase the situational awareness of a flight crew without requiring the robust set of input parameters demanded by conventional ground proximity warning systems and methods. Instead, the ground proximity warning system and method of the present invention are capable of providing various alerts based only upon signals representative of the pressure altitude and the GPS signals without reference to a radio altimeter, an ADC, a glideslope receiver or signals indicative of the configuration of the landing gear or flaps. Thus, aircraft, such as general aviation aircraft, can install the ground proximity warning system and method of the present invention in order to provide increased situational awareness and alerting to a possible controlled flight into terrain (CFIT) situation without having to buy and install a number of other subsystems, such as a radio altimeter, an ADC and a glideslope receiver, that are not generally required for general aviation aircraft and that are prohibitively expensive.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
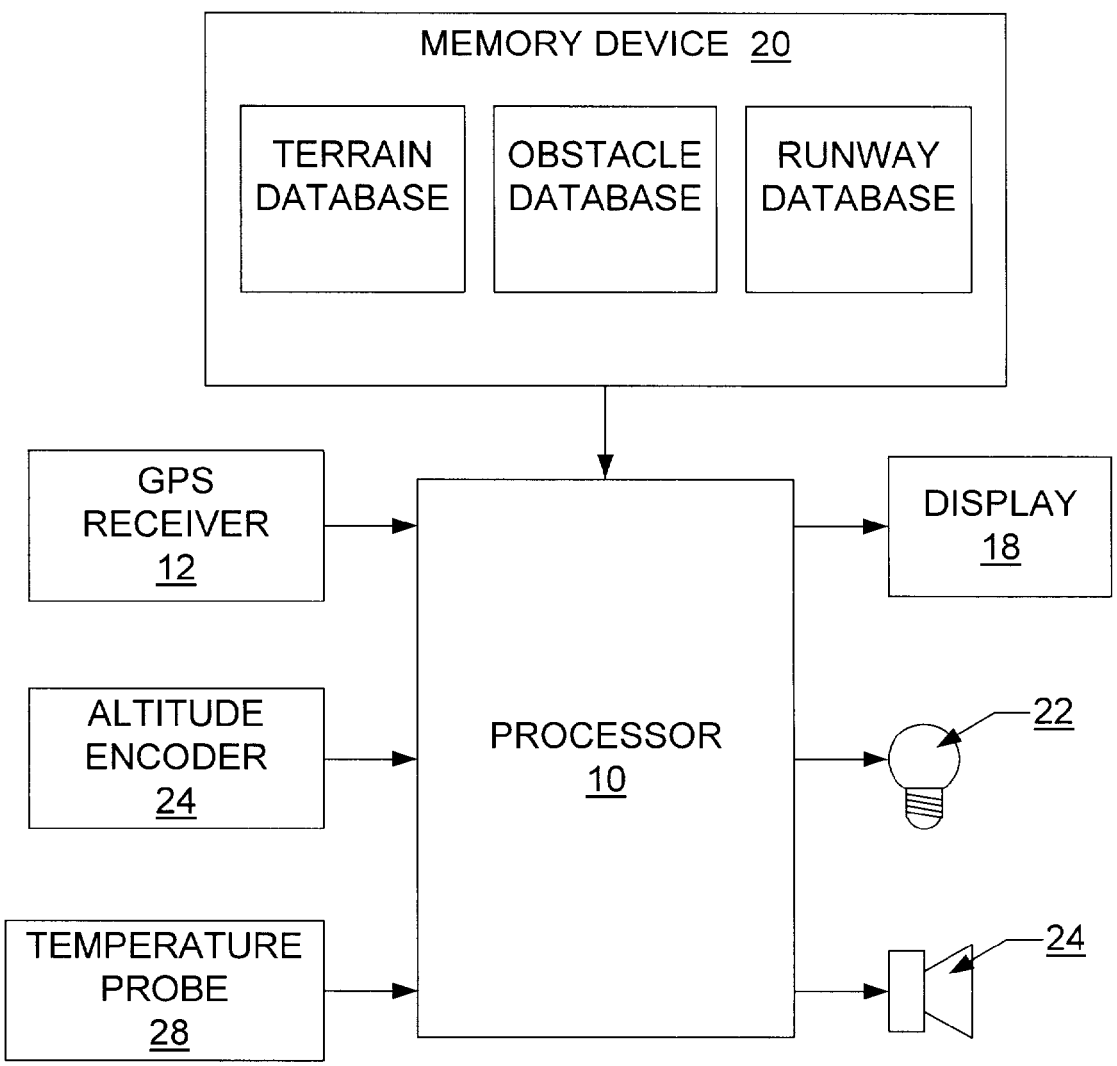
FIG. 1 is a block diagram of a ground proximity warning system and method according to one embodiment of the present invention.

Referring now to FIG. 1, a block diagram depicting the ground proximity warning system and method according to one embodiment of the present invention is depicted. As generally illustrated, the ground proximity warning system and method includes a processor 10 for receiving a limited number of input parameters, for processing the input parameters and for generating a number of different alerts to advise a flight crew of predetermined situations. Typically, the processor is a data processing device, such as a microprocessor, a microcontroller or other central processing unit. However, the processor can be embodied in another logic device such as a DMA (direct memory access) processor, an integrated communication processor device, a custom VLSI (very large scale integration) device, or an ASIC (application specific imbedded circuit) device. Moreover, the processor can be any other type of analog or digital circuitry or any combination of hardware and software that is designed to perform the processing functions described hereinbelow.

In addition to power (not shown), the processor 10 is capable of providing the various alerts described hereinbelow in response to only a limited subset of the input parameters relative to the input parameters required by a conventional ground proximity warning system, such as described by U.S. Pat. No. 5,839,080, the contents of which have been incorporated herein by reference. In this regard, the processor is capable of generating the various alerts described below based only upon the GPS signals and signals indicative of the pressure altitude. In order to refine the altitude calculations as described below, the processor can also receive signals indicative of the external air temperature, such as provided by a conventional 500 ohm temperature probe 14, one example being provided by Bendix/King (Rosemount) as Model No. KTS-283. While the ground proximity warning system and method are capable of generating the various alerts described hereinbelow in response to only a few input signals, it should be apparent that the ground proximity warning system and method of the present invention can receive and process additional signals, if such additional signals are provided by other subsystems carried by the aircraft, in order to further refine the alerts.

The ground proximity warning system of the present invention can interface with a variety of GPS receivers 12 including an AlliedSignal Global GNS-XLS/2100 receiver as well as Honeywell GPS receivers bearing Model Nos. HG2021 and HT9100, either directly or via a GPS Express circuit board. Regardless of the type of GPS unit, the processor 10 preferably receives signals indicative of the latitude and longitude of the aircraft, the ground speed of the aircraft, the ground track angle of the aircraft (also known as the true track angle of the aircraft), the GPS altitude as well as an indication of the quality of the navigation solution provided by the GPS. With respect to the quality of the navigation solution provided by the GPS, the ground proximity warning system preferably receives signals indicative of the vertical figure of the merit (VFOM) and the horizontal figure of merit (HFOM) associated with the latitude and longitude values provided by the GPS. However, the ground proximity warning system can accommodate other types of signals that are indicative of the quality of the navigation solution and that are provided by the GPS, such as a signal indicative of the position dilution of precision (PDOP), a signal indicative of the horizontal dilution of precision (HDOP) and/or a signal representative of the vertical dilution of precision (VDOP).

As known to those skilled in the art, PDOP, HDOP and VDOP are dimensionless quantities that relate the geometry of the satellite constellation that is currently being viewed by the GPS receiver and, accordingly, provide a measure of the quality of the latitude and longitude signals provided by the GPS. The HDOP and VDOP values can be converted to HFOM and VFOM values, respectively, by multiplying the HDOP and PDOP values by the User Equivalent Range Error (UERE) or some multiple thereof. While the UERE is determined in real time by the GPS receiver, the UERE of one exemplary GPS receiver is 33 meters. For example, the processor of one embodiment determines the HFOM and VFOM by multiplying HDOP and VDOP, respectively, by the quantity (2* UERE). The processor then converts HFOM from meters to nautical miles by dividing by 1852 m/nm and VFOM from meters to feet by dividing by 0.3048 m/ft. While the GPS preferably provides quality signals representative of both HFOM and VFOM, the processor can estimate VFOM in instances in which only HDOP or HFOM is provided by initially multiplying or scaling the quantity by a conversion factor, such as 1.5.

In addition to latitude, longitude, ground speed, ground track angle, GPS altitude and signal quality, the processor 10 can also receive and process several additional GPS signals including signals indicative of the GPS vertical velocity, the number of satellites being tracked, the results of Receiver Autonomous Integrity Monitoring (RAIM) and an altitude aiding flag. As known to those skilled in the art, the results of RAIM provide an indication as to whether respective satellites are providing inaccurate data, while the altitude aiding flag identifies instances in which the GPS receiver 12 is communicating with less than four satellites which leads to pressure altitude being utilized in the determination of the GPS altitude as opposed to the GPS altitude being derived independently with respect to pressure altitude.

The processor 10 can receive the pressure altitude from a number of sources. Although not necessary, the aircraft can include an air data computer (ADC), such as a Honeywell model SPZ-800, that provides the pressure altitude and static air temperature, as well as other parameters. Alternatively, an air data/fuel flow computer, such as a Shadin ADC-200 or an RMI uEncoder, can provide the pressure altitude. Still further, the processor can accept pressure altitude from an altitude encoder 16 that provides Gillham/Gray coded altitude data or a blind encoder, either individually or in combination with an altitude serializer. Of the foregoing sources of pressure altitude, altitude encoders generally have the poorest resolution, typically on the order of 100 feet, but are the most widely available sources of pressure altitude readings. As such, the processor is designed to accommodate pressure altitude measurements with a resolution of 100 feet in the course of generating the various alerts. As used herein, pressure altitude generally refers to an uncorrected pressure altitude. In instances in which the pressure altitude can be corrected, however, such as in instances in which the pilot can enter the local air pressure, pressure altitude refers to the corrected pressure altitude. Thus, pressure altitude will be used generically herein for both corrected and uncorrected pressure altitude.

As depicted in FIG. 1, the ground proximity warning system and method provides a number of alerts, typically in both audible and visual form. In addition, the processor 10 can be associated with and can drive a display 18 to not only graphically depict the various warnings, but also to provide an image of the surrounding terrain as described in more detail in U.S. Pat. No. 5,839,080. As such, the ground proximity warning system and method greatly enhance the situational awareness of the flight crew.

Based upon the foregoing input parameters, i.e., the pressure altitude, GPS signals and, optionally, the external air temperature, the ground proximity warning system and method provide alerts comparable to the alerts provided by several of the modes of a conventional ground proximity warning system and method, such as the enhanced ground proximity warning system provided by AlliedSignal Inc. In this regard, the ground proximity warning system and method provides alerts comparable to the Mode 1 and Mode 3 alerts of a conventional ground proximity warning system as well as the altitude callouts of a conventional ground proximity warning system. In addition, the ground proximity warning system and method can provide terrain cautions and warnings based on alert envelopes that generally extend forwardly of the aircraft as described in more detail in U.S. Pat. No. 5,839,080.

With respect to the terrain cautions and warnings, the ground proximity warning system and method and, more particularly, the processor 10 determine a positional relationship between the aircraft and the upcoming terrain. In this regard, the processor preferably generates at least one alert envelope and, more typically, a caution envelope and a warning envelope that define alert regions extending at least forward of the aircraft. As described in more detail in U.S. Pat. No. 5,839,080, each alert envelope is defined by a number of parameters including a look ahead distance (LAD), a base width (DOFF) and a terrain floor ($\Delta H$). See also U.S. patent application Ser. No. 09/495,979, entitled "Apparatus, Methods and Computer Program Products for Determining a Look Ahead Distance Value for High Speed Flight" filed Feb. 1, 2000 for additional discussion of the LAD and U.S. patent application Ser. No. 09/496,297, entitled "Ground Proximity Warning System, Method and Computer Program Product for Controllably Altering the Base Width of an Alert Envelope" filed Feb. 1, 2000, for further discussion of DOFF, the contents of both applications also being incorporated by reference herein.

In addition to constructing the terrain warning and caution envelopes, the processor 10 also compares the terrain warning and caution envelopes to the upcoming terrain and obstacles. In this regard, the ground proximity warning system preferably includes a memory device 20, either accessible by the processor 10 or internal to the processor, for storing a terrain database and, in some embodiments, an obstacle database that includes data representative of the elevation of the terrain or other obstacles at respective geographical coordinates, typically expressed in terms of latitude and longitude.

For example, a terrain database generally divides a region, such as the United States or each state of the United States, into a large number of sub-regions. For each sub-region, the terrain database defines the location of the sub-region and the maximum altitude of the terrain within the sub-region. While each sub-region can have the same size and shape, the sub-regions that include airports and/or highly populated locales are generally smaller so as to have increased resolution. For example, the sub-region near an airport and/or a highly populated locale generally has a square shape that is 0.5 nautical miles per side. In contrast, while the sub-regions in less populated locales also generally have a square shape, these sub-regions are typically 1.0 nautical miles per side. Therefore, in one advantageous embodiment, the resolution of the terrain database is typically 0.5 nautical miles up to 30 nautical miles from a runway and is typically 1.0 nautical miles for regions further from a runway.

The ground proximity warning system also preferably includes a warning mechanism such as a light 22, an audible alarm 24 and/or a graphical display 18 to provide the flight crew with notice of an alert. As such, the processor 10 of this embodiment drives the warning mechanism such that the warning mechanism provides an alert if the processor determines that the positional relationship between the aircraft and the upcoming terrain fails to meet an alert criteria. In particular, the processor generally drives the warning mechanism to generate a warning alert or a cautionary alert in instances in which the upcoming terrain and/or obstacles pierce the warning envelope or the caution envelope, respectively. As such, the flight crew can initiate appropriate evasive action in a timely fashion.

Unlike a conventional ground proximity warning system and method, however, the ground proximity warning system and method of the present invention is capable of determining the positional relationship between the aircraft and the upcoming terrain, such as by constructing warning and caution envelopes, based only upon the pressure altitude, GPS signals and elevational data associated with the upcoming terrain. As described below, the ground proximity warning system and method can also utilize a signal indicative of the external air temperature as well as runway data, if available. As described below, the processor can also utilize runway data to determine the alert criteria since the alert criteria may be altered as the aircraft approaches a runway.

In this regard, the GPS unit 12 provides the current latitude and longitude of the aircraft from which the alert envelopes extend. In to the same fashion as the alert envelopes constructed by a conventional ground proximity warning system and method, the alert envelopes constructed by the ground proximity warning system and method of the present invention are typically centered about the ground track of the aircraft as provided by the GPS unit, such that the center tine of the alert envelopes generally points therealong. In order to further refine the alert envelopes by looking into turns in instances in which the aircraft is turning, the processor preferably constructs the alert envelopes such that the center tine is offset from the ground track of the aircraft, not by the roll angle less 5° as contemplated by conventional ground proximity warning system and method, but by a pseudo roll angle less 5°, since the ground proximity warning system and method of the present invention generally does not receive a signal indicative of the roll angle.

Figure 2:
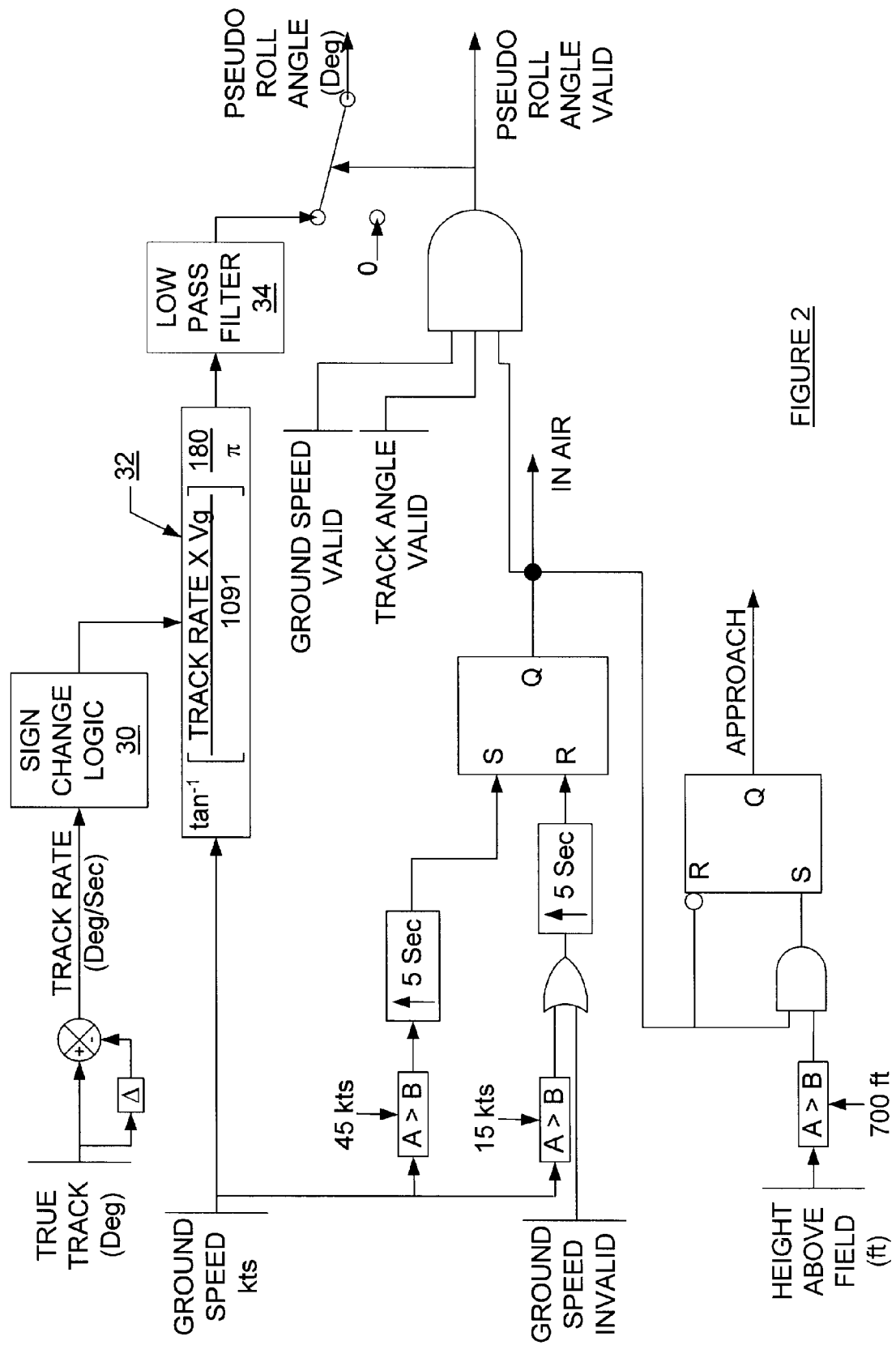
FIG. 2 illustrates the operations performed by the ground proximity warning system and method to determine the pseudo roll angle according to one embodiment of the present invention.

As depicted in FIG. 2, the processor 10 can determine the pseudo roll angle by initially determining the track rate in degrees/second based upon the ground track provided by the GPS 12 and taking into account the sign change of the ground track, i.e., converting ground track values of −180° to +180° to 0° to 360°. See block 30. The processor then determines the pseudo roll angle by subjecting the track rate to a turn rate equation that also takes into account the ground speed Vg prior to low pass filtering the output to smooth the pseudo roll angle, such as by means of a three sample median filter. See blocks 32 and 34.

The processor 10 also preferably determines if the pseudo roll angle is valid prior to broadcasting the pseudo roll angle or otherwise utilizing the pseudo roll angle internally. In this regard, the processor confirms that the. ground speed and track angle are valid based upon validity signals provided by the GPS. In addition, the processor confirms that the aircraft is in the air. While the processor can determine that the aircraft is in the air in various manners, the processor of the embodiment of FIG. 2 determines that the aircraft is in air if the ground speed of the aircraft exceeds a predefined upper speed, such as 45 knots, for a predefined period of time, such as 5 seconds. The processor then will not alter the determination that the aircraft is in the air until the ground speed of the aircraft drops below a predefined lower speed, such as 15 knots, for a predefined period of time, such as 5 seconds or until the GPS indicates that the signal indicative of ground speed is invalid. See FIG. 2. As described, the processor can therefore reliably determine if the aircraft is in the air in a relatively straightforward manner in contrast to a conventional ground proximity warning system and method that rely upon radio altitude and airspeed; two parameters that the ground proximity warning system and method of the present invention need not receive since the ground proximity warning system and method of the present invention is designed to operate in a manner independent of a radio altimeter and an ADC.

Figure 3:
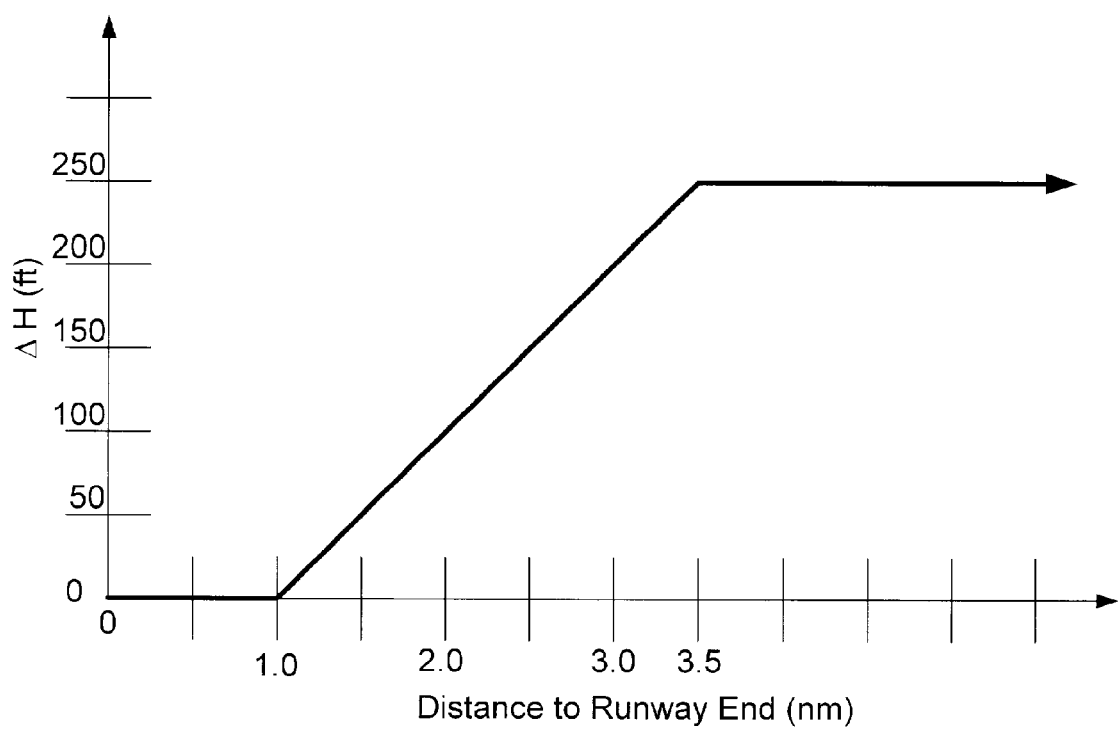
FIG. 3 is a graphical representation of the terrain floor (AH) according to one embodiment of the present invention.

In recognition that the ground proximity warning system and method of the present invention will likely be utilized by smaller general aviation aircraft in contrast to the larger commercial aircraft that generally employ the conventional ground proximity warning system and method, the processor 10 of the ground proximity warning system and method of the present invention preferably limits the terrain floor (ΔH) to 250 feet, as opposed to 500 feet in most conventional ground proximity warning systems and methods, in order to facilitate the lower altitude flying and the non-precision landings conducted by general aviation aircraft without generating undesirable nuisance alarms. For example, while the processor can set ΔH to any desired value, the processor of one embodiment sets ΔH to a value between 0 and 250 feet depending upon the distance of the aircraft from the nearest end of the selected runway as depicted in FIG. 3.

In order to facilitate the selection of the runway and, in turn, the determination of the alert criteria by the processor 10, memory device 20 also generally includes a runway database that includes data defining a plurality of runways. In particular, the runway database generally defines the bearing of each of a plurality of runways as well as the latitude, longitude and elevation of the opposed ends of each of the runways and a factor defining the quality with which the position of each runway end is defined While the runway can be selected in various manners, the processor of one embodiment selects a runway as described by the '924 application based upon the relative positions of the aircraft and the runways. Based upon the selected runway, the processor can then determine the distance to the nearest end of the selected runway.

As known to those skilled in the art, one conventional ground proximity warning system and method defines a terrain database cutoff altitude, such as 400 feet above the elevation of the selected runway. For terrain having an elevation below the terrain database cutoff altitude, this conventional ground proximity warning system and method will not graphically depict the terrain and will not otherwise process elevational data associated with the terrain, thereby avoiding cluttering of the display and the generation of alerts near a runway. Further, a conventional ground proximity warning system and method can determine the terrain database cutoff altitude to be the smaller of a fixed cutoff altitude, such as 400 feet above the elevation of the selected runway, and a dynamic variable cutoff altitude. In this regard, the dynamic variable cutoff altitude is defined to be the current altitude of the aircraft above the selected runway less the terrain floor (ΔH) and also less a bias amount, such as 50 feet.

In order to facilitate flight at lower altitudes above a selected runway, the ground proximity warning system and method of the present invention preferably defines the fixed cutoff altitude to be a smaller value, such as 200 feet, and reduces the bias amount by which the dynamic variable cutoff altitude is reduced, typically to 0. Thus, an aircraft equipped with a ground proximity warning system and method of the present invention can permit flight at lower altitudes above the selected runway without generating alerts and while continuing to display an image of the terrain. Thus, the ground proximity warning system and method of this embodiment of the present invention is particularly advantageous for smaller general aviation aircraft that oftentimes fly at lower altitudes by design.

Figure 4:
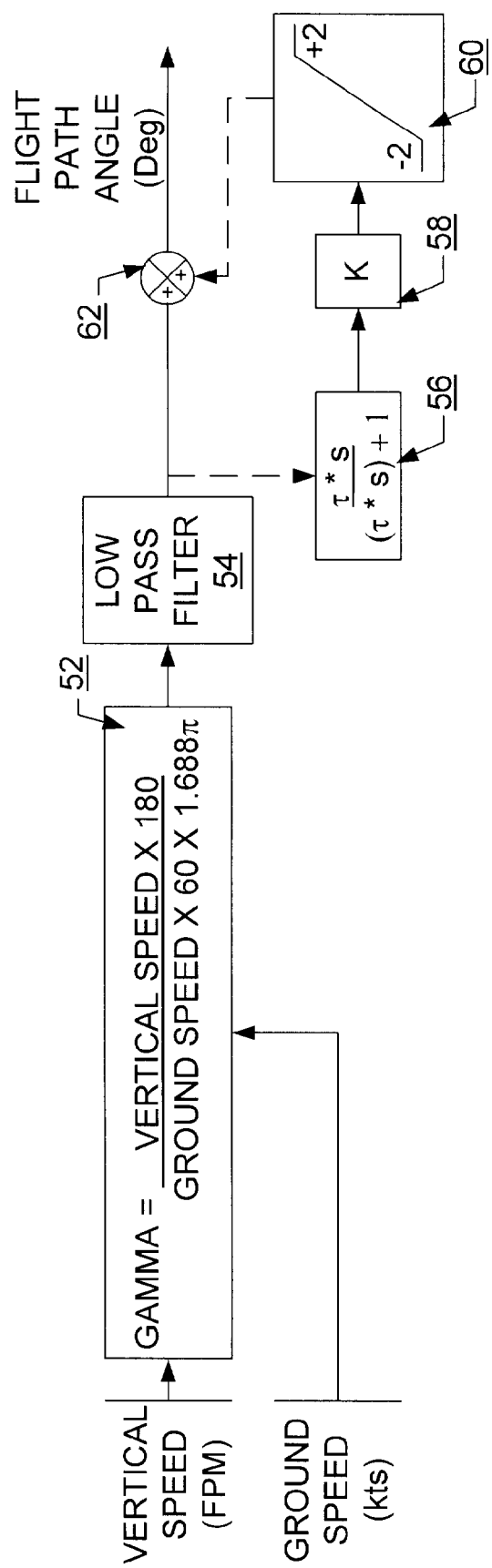
FIG. 4 illustrates the operations performed by the ground proximity warning system and method to determine the flight path angle according to one embodiment of the present invention.

As known to those skilled in the art, the processor 10 preferably constructs the alert envelopes such that the floor of the alert envelopes are at an angle that equal or are otherwise related to the flight path angle. In this regard, FIG. 4 depicts one advantageous technique by which the processor determines the flight path angle based upon vertical velocity and ground speed. While the GPS unit 12 typically provides the ground speed, the processor must typically determine the vertical velocity in instances in which the ground proximity warning system and method is independent of, i.e., does not interface with, an ADC which otherwise provides a barometric rate input. Without a barometric rate input, the processor preferably determines the vertical velocity based upon a combination of the vertical velocity derived from the pressure altitude and the representation of the vertical velocity provided by the GPS since both vertical velocity values have some inherent inaccuracies. In this regard, the pressure altitude may have a relatively low resolution, such as 100 feet in instances in which an altitude encoder 16 provides the pressure altitude, while maintaining relatively long term accuracy. Alternatively, GPS derived vertical velocity is typically very accurate in the short term, i.e., 1 foot resolution generally, but may accumulate errors in the long term due to selective availability errors and the like.

Figure 5:
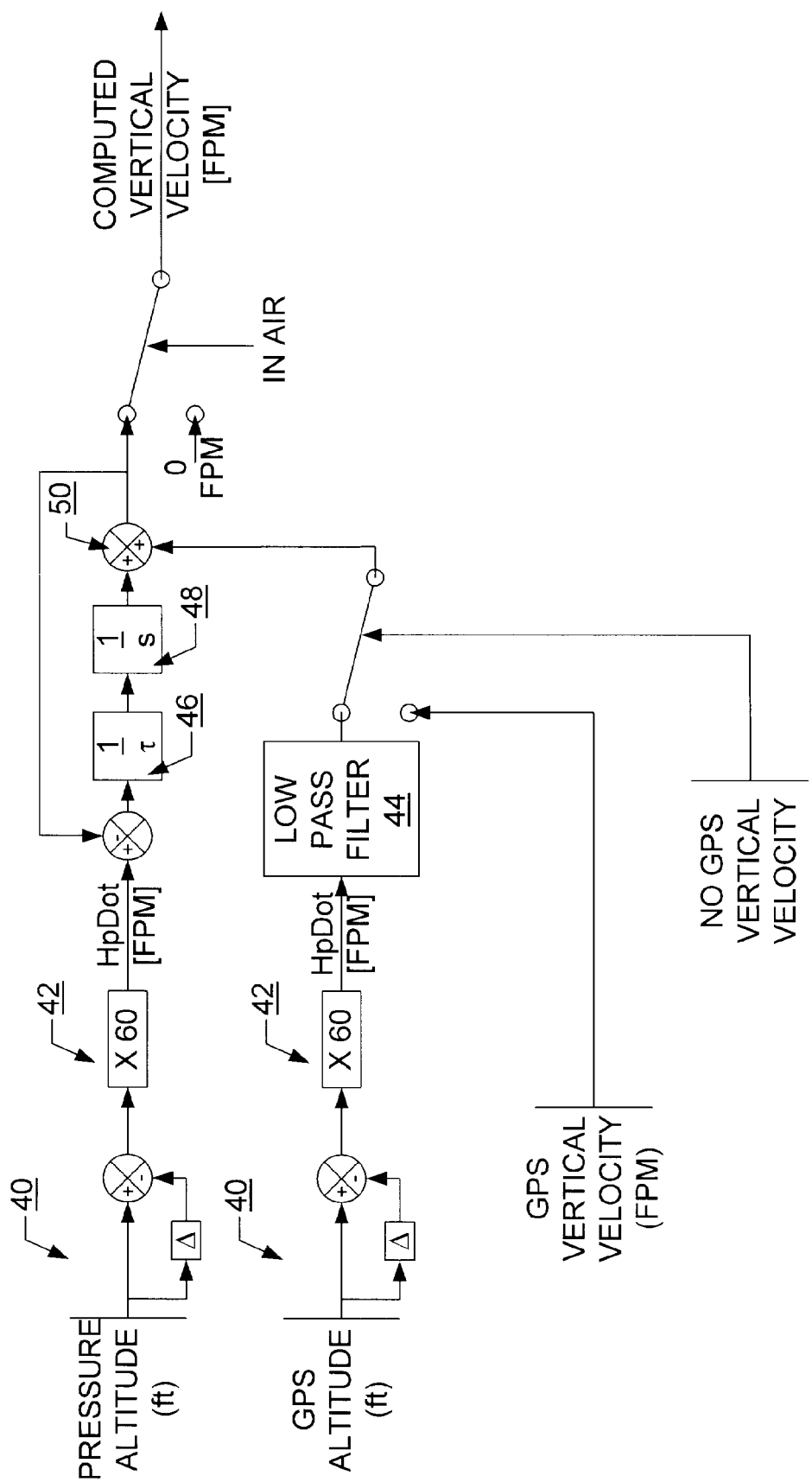
FIG. 5 illustrates the operations performed by the grand proximity warning system and method to determine the vertical velocity according to one embodiment of the present invention.

As such, the processor preferably implements a complementary filter to combine the best attributes of both vertical velocity values. As shown in FIG. 5, for example, the processor 10 preferably generates the rate of change of the pressure altitude and the GPS altitude and multiplies each rate of change by 60 to convert the resulting vertical velocity values to feet per minute as opposed to feet per second. See blocks 40 and 42, respectively. The vertical velocity values derived from pressure altitude and GPS altitude are designated HpDot and HgDot, respectively. The processor then processes the vertical velocity derived from GPS altitude through a low pass filter 44, such as a three sample median filter, in order to smooth the resulting vertical velocity. In contrast, the processor divides the vertical velocity derived from pressure altitude by a filter time constant, τ, and then integrates the result. See blocks 46 and 48 respectively. By dividing by the filter time constant, the processor effectively weights the vertical velocity component derived from the pressure altitude. Preferably, the processor weights the vertical velocity derived from the pressure altitude depending upon the resolution of the pressure altitude with greater time constants and, therefore, less weight being given to pressure altitude values have poorer resolution. In one embodiment, the processor selects the time constant τ as follows:

| Resolution of Pressure Altitude | τ |
|---|---|
| 100 feet | 60 |
| 10 feet | 30 |
| 1 foot | 10 |

So long as the aircraft is determined to be in the air, the processor 10 then sums the vertical velocity components derived from the pressure altitude and the GPS altitude to form the computed vertical velocity in feet per minute. See block 50. As shown, the processor can also negatively feed back the sum of the vertical velocity components such that the computed vertical velocity is actually defined as follows:

$$\text{Computed Vertical Velocity} = \frac{HgDot * \tau S}{\tau S - 1} + \frac{HpDot}{\tau S + 1}$$

Thus, the processor 10 effectively subjects the vertical velocity value derived from pressure altitude to low pass filtering to reduce the high frequency noise. In contrast, the processor effectively subjects the GPS derived vertical velocity value to high pass filtering to reduce long term offset errors.

Accordingly, the processor 10 of the embodiment depicted in FIG. 5 bases the computed vertical velocity primarily upon the GPS derived vertical velocity due to its relatively good resolution with some corrections for drift or other trends away from the pressure altitude derived vertical velocity. Instead of computing the vertical velocity based, in large part, upon the GPS altitude, the processor can compute the vertical velocity based, instead, upon a GPS vertical velocity value if the GPS 12 actually provides a measure of the vertical velocity since GPS altitude may lag somewhat. Thus, the processor of the present invention can effectively determine the vertical velocity without input from an ADC, such as a barometric rate input. For a more detailed discussion of the determination of the vertical velocity, see, for example, U.S. Provisional Patent Application Serial No. 60/134,089, entitled "Vertical Velocity Generator" filed May 14, 1999. This provisional patent application describes the determination of the vertical velocity, and as such, the contents of the provisional application are herein incorporated by reference in their entirety.

Referring again to FIG. 4, the processor 10 can utilize the computed vertical velocity and the ground speed provided by the GPS 12 to determine the flight path angle. In particular, the processor initially computes gamma to be equal to (vertical speed*180)/(ground speed*60*1.688*π). See block 52. The processor then passes gamma through a low pass filter 54, such as a three sample medium filter, to smooth the gamma value, which defines the flight path angle. Thereafter, the processor preferably constructs the alert envelopes to have a floor that slopes at an angle that equals or otherwise varies with the computed flight path angle.

In order to permit a normal level off maneuver (defined as a constant g pull of 1 ft/sec$^2$) at descent rates up to 1500 feet per minute to a minimum descent altitude of 350 feet above ground level without the generation of nuisance alarms, the processor 10 can add a lead term to the flight path angle. In this regard, the processor can add a lead term as depicted in dashed lines in FIG. 4 by subjecting gamma to feed forward processing. In this regard, the processor initially determines the gamma rate in degrees per second by multiplying gamma by $$\frac{\tau * S}{\tau * S + 1}.$$

See block 56. While the time constant τ can have different values, the processor typically sets τ to 2 seconds. The processor then multiplies the gamma rate by a constant K, which defines the desired lead term, such as K=5 for a 5 second lead term. See block 58. After limiting the result, such as between −2 and +2, the processor recombines the fed forward signal with gamma to define a flight path angle with a lead term. See blocks 60 and 62, respectively. Since the incorporation of a lead term into the flight path angle is primarily intended to permit normal level off maneuvers during final approach without the generation of nuisance alerts, the processor 10 preferably sets K to zero at all times other than final approach and then changes K to a positive value, such as 5, to provide the lead term during final approach.

As described, the ground proximity warning system and method of the present invention is capable of determining the positional relationship of the aircraft to the underlying terrain based only upon signals indicative of the pressure altitude, GPS signals and elevational data associated with the upcoming terrain. Conversely, the ground proximity warning system and method of the present invention is independent of and need not receive signals from a radio altimeter, an ADC or a glideslope receiver or signals indicative of the configuration of the landing gear and flaps as required by conventional ground proximity warning systems and methods. Thus, the ground proximity warning system and method of the present invention is particularly advantageous for general aviation aircraft that are not generally mandated to have a radio altimeter, an ADC or a glideslope receiver and, therefore, do not generally have such expensive equipment.

In addition to determining the positional relationship of the aircraft to the upcoming terrain and issuing warnings if the alert criteria are violated, the ground proximity warning system and method of the present invention also provide similar alerts to those provided by at least one of Modes 1 and 3 and the altitude callouts of Mode 6 of a conventional ground proximity warning system and method, albeit with only a subset of the input parameters. In this regard, the ground proximity warning system and method of one embodiment detects an excessive descent rate at a relatively low altitude above ground and issues a "sinkrate" and/or a "pull up" alert depending upon the perceived severity, similar to the Mode 1 alerts of a conventional ground proximity warning system and method. While a conventional ground proximity warning system and method generates Mode 1 alerts based upon a predetermined criteria between the radio altitude and the descent rate, the ground proximity warning system and method of this embodiment and, in particular, the processor 10 generates alerts based upon an alert criteria between a pseudo radio altitude and the descent rate, since the ground proximity warning system and method of the present invention are typically independent of a radio altimeter and therefore do not receive signals indicative of the radio altitudes.

According to the present invention, the processor 10 preferably determines the pseudo radio altitude as the difference between the geometric altitude of the aircraft and the elevation of the underlying terrain, as defined by the associated terrain databases. In this regard, since the ground proximity warning system and method of the present invention need not be associated with either a radio altimeter or an ADC, the processor does not calibrate the geometric altitude based upon the radio altitude or the corrected barometric altitude. Instead, the processor determines the geometric altitude based upon GPS altitude, pressure altitude and, optionally, the external air temperature. See, for example, U.S. patent application Ser. No. 09/255,670 (hereinafter the '670 application) entitled "Method and Apparatus for Determining Altitude" filed Feb. 23, 1999, the contents of which are incorporated herein.

Figure 6:
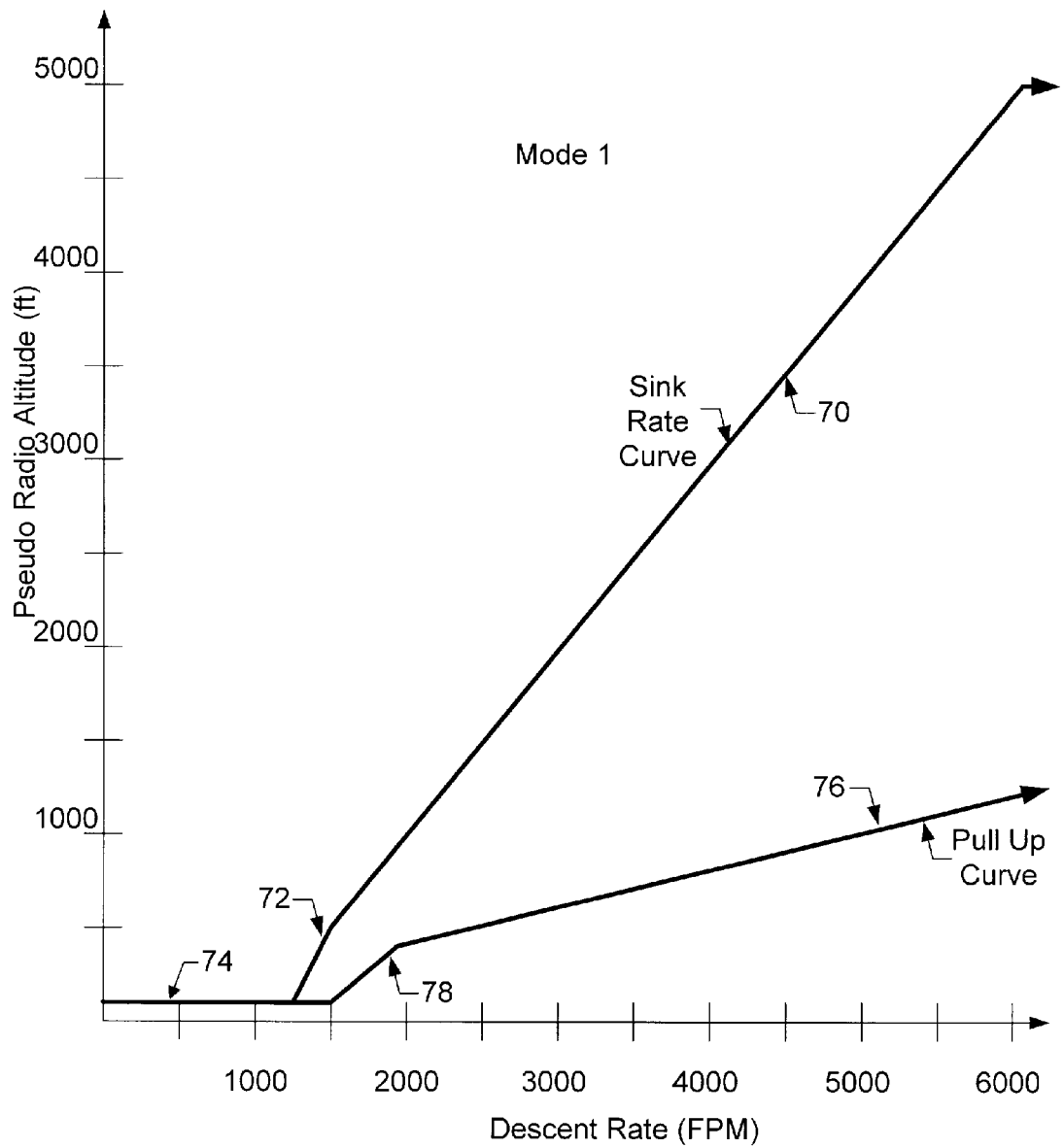
FIG. 6 illustrates the predefined relationship between the pseudo radio altitude and descent rate that defines the Mode 1 alerts provided by a ground proximity warning system and method according to one embodiment of the present invention.

In addition to the geometric altitude, the ground proximity warning system and method of this embodiment and, more particularly, the processor 10 determines the descent rate which is equal to the vertical velocity of the aircraft, typically computed as described above in conjunction with FIG. 4. As illustrated in FIG. 6, the processor also defines a predetermined relationship between the pseudo radio altitude and the descent rate such that the processor will actuate the associated warning mechanism to issue an alert if the descent rate exceeds a predefined maximum descent rate for the current pseudo radio altitude. While the processor can define various predefined relationships between the pseudo radio altitude and the descent rate, the processor of one embodiment defines different relationships depending upon the pseudo radio altitude. For example, for pseudo radio altitudes above a predetermined maximum, such as 5000 feet, the processor will not generate any Mode 1 alerts, irrespective of the descent rate. For pseudo radio altitudes between 500 feet and 2300 feet, the processor defines a linear threshold 70 defining a relationship between pseudo radio altitude and descent rate and generates alerts at descent rates that exceed the threshold for the respective pseudo radio altitude. While the processor can define a variety of linear thresholds, the processor of one embodiment defines a linear threshold that will generate an alert at least 20 seconds prior to impact at the current descent rate. Although not necessary for the practice of the present invention, the processor can define a second linear threshold 72 for lower pseudo radio altitudes, i.e., below 500 feet. As depicted in FIG. 5, the processor preferably defines the second linear threshold to have a steeper slope in order to allow increased maneuvering near the ground, as is more common for general aviation aircraft.

As described in the aforementioned '670 patent application, the geometric altitude has an associated vertical figure of merit (VFOM), such as 300 feet, for example, that serves as a limit on the accuracy or resolution of the geometric altitude. Since the pseudo radio altitude is based upon the geometric altitude, the accuracy or resolution of the pseudo radio altitude is also limited by the geometric altitude VFOM. Thus, the processor 10 preferably disables the warning mechanism and provides no more alerts at pseudo radio altitudes at or below the geometric altitude VFOM, as indicated by the horizontal line 74 in FIG. 6. Thus, the processor prevents nuisance alarms from being generated at pseudo radio altitudes lower than the geometric altitude VFOM.

In addition to the predefined relationship between the pseudo radio altitude and the descent rate described above and termed the sinkrate curve due to the generation of an audible alert of "sinkrate" for excessive descent rates, the processor 10 also defines another relationship (a pull up curve) between pseudo radio altitude and descent rate at which a more severe "pull up" alert will be generated. The processor preferably defines the pull up curve to be similar to the pull up curve of a conventional ground proximity warning system and method, albeit with reference to pseudo radio altitude as opposed to radio altitude. Thus, the processor generally defines the pull up curve to have a major linear segment 76 and a steeper linear segment 78 at lower pseudo radio altitudes above ground without generating nuisance alarms. In addition, the processor preferably limits the pull up curve at low pseudo radio altitudes such that the warning mechanism is disabled and alerts are not generated for pseudo radio altitudes equal to or less than the geometric altitude VFOM, thereby preventing additional nuisance alarms as described above.

Unlike the Mode 1 alerts generated by a conventional ground proximity warning system and method, the ground proximity warning system and method of the present invention and, in particular, the processor 10 does not bias the sinkrate and pull up curves based upon deviations from the glideslope or the unusually steep approaches that are suggested at some airports. Thus, the generation of the Mode 1 alerts by the processor is simplified according to this embodiment of the present invention relative to a conventional ground proximity warning system and method.

In addition to Mode 1 alerts, the ground proximity warning system and method of the present invention can provide an alert for excessive descent after takeoff in a manner analogous to the Mode 3 alerts provided by a conventional ground proximity warning system and method. In contrast to a conventional ground proximity warning system and method that generates Mode 3 alerts based upon a predefined relationship between radio altitude and altitude loss, the ground proximity warning system and method of the present invention and, in particular, the processor 10 generates alerts based upon a predefined relationship between a measure of the height above field and altitude loss, since the ground proximity warning system and method of the present invention is designed to be independent of a radio altimeter and, therefore, does not receive signals indicative of the radio altitude.

According to this embodiment, the processor 10 preferably determines the height above field to be equal to the difference between the geometric altitude and the elevation of the runway from which the aircraft departed. In this regard, the processor preferably utilizes the geometric altitude since its resolution is generally better than the pressure altitude, at least over the short term following take off during which Mode 3 is active. While the processor could determine the elevation of the runway to be equal to the elevation of the runway stored in the runway database that can also be maintained in the memory device 20, the processor can also determine the elevation of the runway by other techniques without departing from the spirit and scope of the present invention. For example, the processor can set the elevation of the runway to the value of the geometric altitude at the time that the processor determines that the aircraft is in air. Alternatively, the processor can determine the height above field by integrating the computed vertical velocity from the time that the aircraft is in air. In addition, the processor preferably defines the altitude loss to be a decrease in geometric altitude during a generally short period of time following take off.

Figure 7:
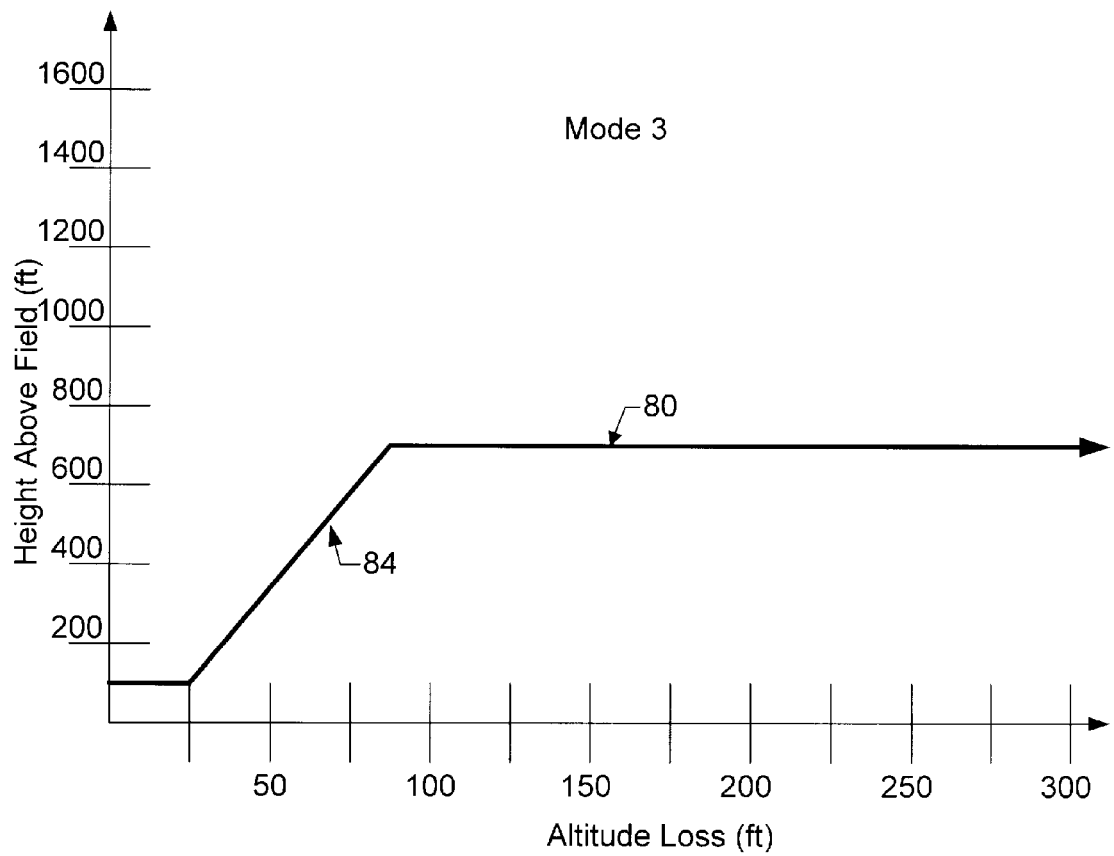
FIG. 7 illustrates the predefined relationship between the height above ground and altitude loss that defines the Mode 3 alerts provided by a ground proximity warning system and method according to one embodiment of the present invention.

As depicted in FIG. 7, the processor 10 typically defines a predetermined relationship between the height above field and the altitude loss that can be graphically expressed as a curve comprised of several linear segments. In this regard, the processor preferably disables the warning mechanism and prevents alarms above a predefined maximum height above field, such as 700 feet, to eliminate nuisance alarms for pattern work and for altitude flight. See segment 80. In addition, the processor preferably disables the warning mechanism and prevents alarms for any height above field that is equal to or less than the geometric altitude VFOM in order to further reduce nuisance alarms as described above. See segment 82. For heights above field between the geometric altitude VFOM and the predefined maximum height above field, the processor preferably actuates the warning mechanism to issue an alert if the altitude loss exceeds a predetermined threshold established for the respective height above field. See segment 84. Thus, the flight crew can take appropriate action to ascent prior to more closely approaching the ground.

In contrast to the Mode 3 alerts provided by a conventional ground proximity warning system and method, the ground proximity warning system and method of this embodiment does not rearm the processor to generate additional Mode 3 alerts in instances in which the aircraft is going around, primarily because the ground proximity warning system and method of the present invention is designed to be independent of signals representative of the configuration of the landing gear and flaps which are typically required by a conventional ground proximity warning system and method to rearm the Mode 3 alerts. Thus, the ground proximity warning system and method of this embodiment is simplified relative to a conventional ground proximity warning system and method that provides Mode 3 alerts.

The ground proximity warning system and method of one advantageous embodiment also provides call outs at one or more predetermined altitudes above ground in instances in which the aircraft is within a predefined range of a runway, such as 5 nautical miles. Thus, the ground proximity warning system and method of the embodiment can provide altitude call outs much like those provided by Mode 6 of a conventional ground proximity warning system and method.

Figure 8:
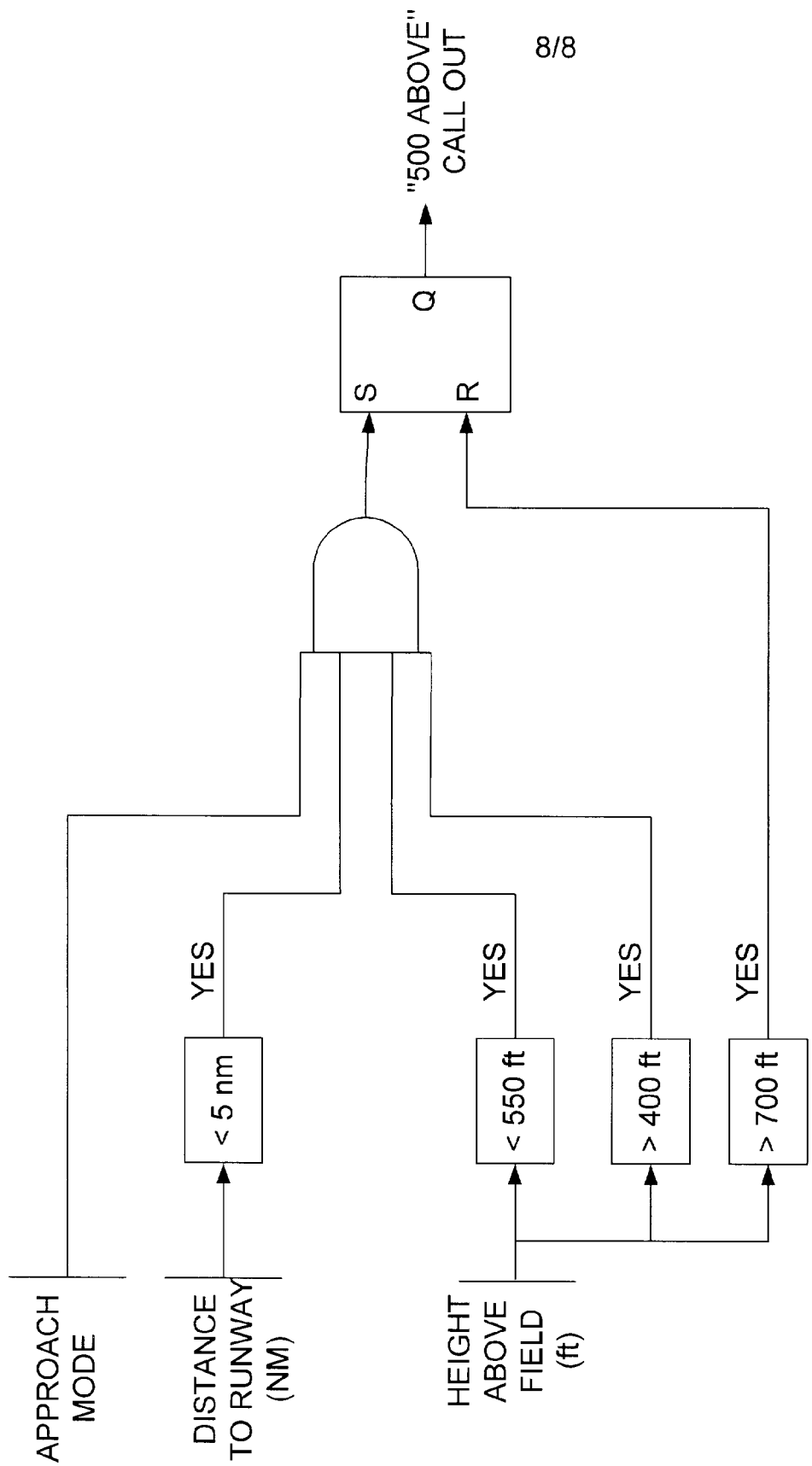
FIG. 8 illustrates the operations performed by the ground proximity warning system and method to provide altitude call outs according to one embodiment of the present invention.

In one embodiment, the processor 10 generates an altitude call out at approximately 500 feet above ground for an aircraft in an approach and within 5 nautical miles of a runway, as shown in FIG. 8. With respect to the distance to the runway, the processor typically determines the distance between the latitude and longitude of the aircraft, as provided by the GPS unit 12 receiver, and the latitude and longitude provided by the runway database for the intended runway, preferably selected by the processor as described by the '924 application. While the processor 10 can determine that the aircraft is in an approach mode in various manners, the processor of one embodiment determines that the aircraft is in an approach mode if the aircraft is determined to be in the air and the aircraft is more than a predetermined altitude above the runway, such as 700 feet in one example depicted in FIG. 2.

In the illustrated embodiment, the processor 10 actuates the warning mechanism to generate an alert if the height above field falls to between 550 feet and 400 feet during an approach and within 5 nautical miles of the selected runway, although other embodiments can provide callouts at other altitudes and/or within other ranges of the runway. The processor typically drives the warning mechanism to generate a single alert upon falling below 550 feet above the runway and does not generate another alert until the aircraft has climbed to above a reset altitude, such as 700 feet above the runway, before descending to below 550 feet again. In this regard, it is noted that the processor generates a call out of 500 feet above the runway upon the height above field falling to 550 feet, as opposed to 500 feet, in order to accommodate the resolution of the geometric altitude and to generally insure that the 500 foot call out is generated at no lower height above field than 500 feet.

In addition, the ground proximity warning system and method of the present invention and, in particular, the processor 10 of the present invention can also determine the positional relationship between the aircraft and a runway, i.e., the selected runway as described by the '924 application. In this regard, the processor is capable of determining the positional relationship between the aircraft and the runway based only upon the pressure altitude, the GPS signals and the data provided by the runway database that defines the position of the various runways. For example, the processor can generate an obstacle clearance floor, also known as a runway field clearance floor (RFCF) envelope, about a selected runway that defines minimum altitudes that should be maintained relative to the elevation of the runway, not necessarily relative to the terrain underlying the aircraft. Thus, the ground proximity warning system and method of this embodiment can provide alerts of rather abrupt changes in elevation at or near a selected runway while not unnecessarily increasing the number of nuisance alarms. For example, U.S. patent application Ser. No. 09/496,298, entitled "Apparatus, Methods, Computer Program Products for Generating a Runway Field Clearance Floor Envelope About a Selected Runway" filed Feb. 1, 2000 further describes the generation of an obstacle clearance floor, the contents of which are incorporated herein by reference. As described above in conjunction with other aspects of the ground proximity warning system and method of the present invention, the ground proximity warning system and method determines the height above field based on the geometric altitude and the elevation of the runway and, once the aircraft is within 5 nautical miles of the runway, further determines if the aircraft at the current height above runway has fallen below a predefined obstacle clearance floor, in which case an alert is issued. While the processor could determine the distance to runway based upon the difference between the current position of the aircraft and the position of the runway that is stored in the runway database, the processor preferably determines a corrected distance to runway end as described by U.S. patent application Ser. No. 09/495,630, entitled "Methods, Apparatus and Computer Program Products for Determining a Corrected Distance Between an Aircraft and a Selected Runway" filed Feb. 1, 2000, the contents of which are also incorporated herein by reference. In either event, the ground proximity warning system and method and, in particular, the warning mechanism of this embodiment provides yet another type of alert to further enhance the situational awareness of the flight crew, such as in instances in which the flight path of the aircraft would otherwise potentially cause the aircraft to land short of the runway or in various other CFIT situations.

In addition to the audible alerts and warning lights 22 actuated by the processor 10, the ground proximity warning system and method of the resent invention preferably includes a display 18 which depicts the local and upcoming terrain in various colors depending upon the relative elevation of the terrain with respect for the airway as described by U.S. Pat. No. 5,839,080. While the ground proximity warning system and method can configure the display in various manners, the ground proximity warning system and method of one embodiment presents the image in a track up orientation while the aircraft is in flight. In addition, the ground proximity warning system and method of this embodiment can alter the image to a north up plan view with the aircraft in the center while the aircraft is on the ground since the aircraft will no longer have a track. However, the ground proximity warning system and method can also permit the flight crew, a technician or the like to configure the display, including varying the range, as desired. For example, the ground proximity warning system and method can depict the local and upcoming terrain in a vertical profile presentation. In addition, the local and upcoming terrain, the ground proximity warning system and method can present an image of the selected runway on the display. Further, the ground proximity warning system and method can overlay a trend vector, such as for a 30 second or 60 second path, and/or flight planning information on the image of the terrain, if so desired.

In addition to permitting at least some configuration of the display 18 by the flight crew, a technician or the like, the ground proximity warning system and method can permit additional configuration, if so desired. For example, the ground proximity warning system and method of one embodiment permit various ones of the predefined elevations or altitudes to be customized by the flight crew, a technician or the like to better tailor the ground proximity warning system and method to a particular application.

Therefore, the ground proximity warning system and method of the present invention provide alerts in various predefined situations in order to substantially increase the situational awareness of a flight crew without requiring the robust set of input parameters demanded by conventional ground proximity warning systems and methods. Instead, the ground proximity warning system and method of the present invention are capable of providing various alerts based only upon signals representative of the pressure altitude and, the GPS signals without reference to a radio altimeter, an ADC, a glideslope receiver or signals indicative of the configuration of the landing gear or flaps. Thus, aircraft, such as general aviation aircraft, can install the ground proximity warning system and method of the present invention in order to provide increased situational awareness without having to buy and install a number of other subsystems, such as a radio altimeter, an ADC and a glideslope receiver, that are not typically required for general aviation aircraft and that are prohibitively expensive.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A ground proximity warning system comprising:
   a processor, responsive to a global position system (GPS) receiver, for determining a positional relationship between an aircraft and upcoming terrain;
   a warning mechanism, responsive to said processor, for providing an alert if said processor determines that the positional relationship between the aircraft and the upcoming terrain fails to meet an alert criteria; and
   a memory device for storing a terrain database defining the elevational data for the upcoming terrain, wherein said processor determines a geometric altitude of the aircraft and a difference between the geometric altitude and an elevation of local terrain, and wherein said warning mechanism provides an alert if the difference between the geometric altitude and the elevation of the local terrain is less than a predetermined altitude;
   wherein said processor is capable of determining the positional relationship between the aircraft and the upcoming terrain based only upon a pressure altitude, signals provided by the GPS receiver and elevational data associated with the upcoming terrain.

2. A ground proximity warning system according to claim 1 wherein said processor is capable of determining the positional relationship between the aircraft and the upcoming terrain in a manner independent of at least one signal selected from the group consisting of signals indicative of radio altitude, indicated airspeed, roll angle, respective positions of landing gear and flaps and a glideslope.

3. A ground proximity warning system according to claim 2 wherein said processor is capable of determining the positional relationship between the aircraft and the upcoming terrain in a manner independent of each of the signals indicative of radio altitude, indicated airspeed, roll angle, respective positions of landing gear and flaps and the glideslope.

4. A ground proximity warning system according to claim 1 wherein said processor defines the alert criteria at least partially based upon data associated with a runway.

5. A ground proximity warning system according to claim 1 wherein said processor is also capable of determining a positional relationship between the aircraft and a runway based only upon the pressure altitude, signals provided by the GPS receiver and data associated with the runway, and wherein said warning mechanism is also capable of providing an alert if said processor determines that the positional relationship between the aircraft and the runway fails to meet a predetermined criteria.

6. A ground proximity warning system according to claim 1 further comprising a memory device for storing a terrain database defining the elevational data for the upcoming terrain, wherein said processor constructs a warning envelope extending in advance of the aircraft and compares the warning envelope to the upcoming terrain based on the elevational data associated with the upcoming terrain, and wherein said warning mechanism provides a warning alert if said processor determines that the upcoming terrain will pierce the warning envelope.

7. A ground proximity warning system according to claim 6 wherein said processor further constructs a caution envelope extending further in advance of the aircraft than the warning envelope and compares the caution envelope to the upcoming terrain based on the elevational data associated with the upcoming terrain, and wherein said warning mechanism provides a cautionary alert if said processor determines that the upcoming terrain will pierce the caution envelope.

8. A ground proximity warning system according to claim 1 wherein said processor is also responsive to a temperature probe such that said processor is capable of determining the positional relationship between the aircraft and the upcoming terrain based upon a temperature in addition to the pressure altitude, the signals provided by the GPS receiver and elevational data associated with the upcoming terrain.

9. A ground proximity warning system according to claim 1 wherein said processor is responsive to at least one GPS signal selected from the group consisting of GPS signals indicative of a latitude, longitude, ground speed, ground track, GPS altitude and a quality parameter.

10. A method for providing ground proximity warnings comprising:
   determining a positional relationship between an aircraft and upcoming terrain, wherein the positional relationship is capable of being determined based only upon a pressure altitude, signals provided by a global position system (GPS) receiver and elevational data associated with the upcoming terrain;
   providing an alert if the positional relationship between the aircraft and the upcoming terrain fails to meet an alert criteria;
   accessing a terrain database defining the elevational data for the upcoming terrain,
   wherein said determining step comprises determining a geometric altitude of the aircraft and a difference between the geometric altitude and an elevation of local terrain, and wherein said providing step comprises providing an alert if the difference between the geometric altitude and the elevation of the local terrain is less than a predetermined altitude.

11. A method according to claim 10 wherein said determining step comprises determining the positional relationship between the aircraft and the upcoming terrain in a manner independent of at least one signal selected from the group consisting of signals indicative of radio altitude, indicated airspeed, roll angle, respective positions of landing gear and flaps and a glideslope.

12. A method according to claim 11 wherein said determining step comprises determining the positional relationship between the aircraft and the upcoming terrain in a manner independent of each of the signals indicative of radio altitude, indicated airspeed, roll angle, respective positions of landing gear and flaps and the glideslope.

13. A method according to claim 10 further comprising determining the alert criteria at least partially based upon data associated with a runway.

14. A method according to claim 10 further comprising:
   determining a positional relationship between an aircraft and a runway based only upon the pressure altitude, signals provided by a global position system (GPS) receiver and data associated with the runway; and
   providing an alert if the positional relationship between the aircraft and the runway fails to meet a predetermined criteria.

15. A method according to claim 10 further comprising accessing a terrain database defining the elevational data for the upcoming terrain, wherein said determining step comprises constructing a warning envelope extending in advance of the aircraft and comparing the warning envelope to the upcoming terrain based on the elevational data associated with the upcoming terrain, and wherein said providing step comprises providing a warning alert if the upcoming terrain will pierce the warning envelope.

16. A method according to claim 15 wherein said determining step further comprises constructing a caution envelope extending further in advance of the aircraft than the warning envelope and comparing the caution envelope to the upcoming terrain based on the elevational data associated with the upcoming terrain, and wherein said providing step further comprises providing a cautionary alert if the upcoming terrain will pierce the caution envelope.

17. A method according to claim 10 wherein said determining step comprises determining the positional relationship between the aircraft and the upcoming terrain based upon a temperature in addition to the pressure altitude, the signals provided by the GPS receiver and elevational data associated with the upcoming terrain.

18. A ground proximity warning system providing Mode 1, Mode 3 and Mode 6 alert modes comprising:
   a processor, responsive to a global position system (GPS) receiver, for determining a positional relationship between an aircraft and upcoming terrain and for selecting one of the alert modes; and
   a warning mechanism, responsive to said processor, for providing an alert if said processor determines that the positional relationship between the aircraft and the upcoming terrain fails to meet an alert criteria associated with said selected alert mode, wherein said processor determines the positional relationship and selects the alert mode in a manner independent of signals indicative of radio altitude, respective positions of landing gear and flaps and a glideslope.

19. A ground proximity warning system according to claim 18 wherein said processor defines the alert criteria at least partially based upon data associated with a runway.

20. A ground proximity warning system according to claim 18 wherein said processor is capable of determining the positional relationship between the aircraft and the upcoming terrain in a manner that is also independent of signals indicative of indicated airspeed and roll angle.

21. A ground proximity warning system according to claim 18 wherein said processor is capable of determining the positional relationship between the aircraft and the upcoming terrain based only upon a pressure altitude, signals provided by the GPS receiver and elevational data associated with the upcoming terrain.

22. A ground proximity warning system according to claim 21 wherein said processor is also capable of determining the positional relationship between the aircraft and a runway based only upon the pressure altitude, signals provided by the GPS receiver and data associated with the runway, and wherein said warning mechanism is also capable of providing an alert if said processor determines that the positional relationship between the aircraft and the runway fails to meet a predetermined criteria.

23. A ground proximity warning system according to claim 21 wherein said processor is also responsive to a temperature probe such that said processor is capable of determining the positional relationship between the aircraft and the upcoming terrain based upon a temperature in addition to the pressure altitude, the signals provided by the GPS receiver and the elevational data associated with the upcoming terrain.

24. A ground proximity warning system according to claim 18 further comprising a memory device for storing a terrain database defining the elevational data for the upcoming terrain, wherein said processor constructs a warning envelope extending in advance of the aircraft and compares the warning envelope to the upcoming terrain based on the elevational data associated with the upcoming terrain, and wherein said warning mechanism provides a warning alert if said processor determines that the upcoming terrain will pierce the warning envelope.

25. A ground proximity warning system according to claim 24 wherein said processor further constructs a caution envelope extending further in advance of the aircraft than the warning envelope and compares the caution envelope to the upcoming terrain based on the elevational data associated with the upcoming terrain, and wherein said warning mechanism provides a cautionary alert if said processor determines that the upcoming terrain will pierce the caution envelope.

26. A ground proximity warning system according to claim 18 further comprising a memory device for storing a terrain database defining the elevational data for the upcoming terrain, wherein said processor determines a geometric altitude of the aircraft and a difference between the geometric altitude and an elevation of local terrain, and wherein said warning mechanism provides an alert if the difference between the geometric altitude and the elevation of the local terrain is less than a predetermined altitude.

27. A ground proximity warning system according to claim 18 wherein said processor is responsive to at least one GPS signal selected from the group consisting of GPS signals indicative of a latitude, longitude, ground speed, ground track, GPS altitude and a quality parameter.

28. A method for providing ground proximity warnings for Mode 1, Mode 3 and Mode 6 alert modes comprising:
  determining a positional relationship between an aircraft and upcoming terrain based upon signals from a global position system (GPS) receiver and independent of signals indicative of radio altitude, respective positions of landing gear and flaps and a glideslope;
  selecting one of the alert modes based upon signals from a global position system (GPS) receiver and independent of signals indicative of radio altitude, respective positions of landing gear and flaps and a glideslope; and
  providing an alert if the positional relationship between the aircraft and the upcoming terrain fails to meet an alert criteria associated with said selected alert mode.

29. A method according to claim 28 further comprising determining the alert criteria at least partially based upon data associated with a runway.

30. A method according to claim 28 wherein said determining step comprises determining the positional relationship between the aircraft and the upcoming terrain in a manner that is also independent of signals indicative of indicated airspeed and roll angle.

31. A method according to claim 28 wherein said determining step comprises determining the positional relationship between the aircraft and the upcoming terrain based only upon a pressure altitude, signals provided by the GPS receiver and elevational data associated with the upcoming terrain.

32. A method according to claim 31 further comprising:
  determining a positional relationship between the aircraft and a runway based only upon the pressure altitude, signals provided by the GPS receiver and data associated with the runway; and
  providing an alert if the positional relationship between the aircraft and the runway fails to meet a predetermined criteria.

33. A method according to claim 31 wherein said determining step further comprises determining the positional relationship between the aircraft and the upcoming terrain based upon a temperature in addition to the pressure altitude, the signals provided by the GPS receiver and the elevational data associated with the upcoming terrain.

34. A method according to claim 28 further comprising accessing a terrain database defining elevational data for the upcoming terrain, wherein said determining step comprises constructing a warning envelope extending in advance of the aircraft and comparing the warning envelope to the upcoming terrain based on the elevational data associated with the upcoming terrain, and wherein said providing step comprises providing a warning alert if the upcoming terrain will pierce the warning envelope.

35. A method according to claim 34 wherein said determining step further comprises constructing a caution envelope extending further in advance of the aircraft than the warning envelope and comparing the caution envelope to the upcoming terrain based on the elevational data associated with the upcoming terrain, and wherein said providing step further comprises providing a cautionary alert if the upcoming terrain will pierce the caution envelope.

36. A method according to claim 28 further comprising accessing a terrain database defining elevational data for the upcoming terrain, wherein said determining step comprises determining a geometric altitude of the aircraft and a difference between the geometric altitude and an elevation of local terrain, and wherein said providing step comprises providing an alert if the difference between the geometric altitude and the elevation of the local terrain is less than a predetermined altitude.

* * * * *